United States Patent
Thuresson et al.

(10) Patent No.: US 11,457,147 B2
(45) Date of Patent: Sep. 27, 2022

(54) METHOD FOR ENHANCING THE PERFORMANCE OF A VIDEO CAMERA

(71) Applicant: Axis AB, Lund (SE)

(72) Inventors: Axel Thuresson, Lund (SE); Imran Iqbal, Lund (SE); Marcus Dittmer Wennermark, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/233,681

(22) Filed: Apr. 19, 2021

(65) Prior Publication Data

US 2021/0409599 A1    Dec. 30, 2021

(30) Foreign Application Priority Data

Jun. 25, 2020   (EP) ..................... 20182334

(51) Int. Cl.
*H04N 5/232*   (2006.01)
*H04N 5/225*   (2006.01)

(52) U.S. Cl.
CPC ....... *H04N 5/23245* (2013.01); *H04N 5/2254* (2013.01)

(58) Field of Classification Search
CPC ............ H04N 5/23245; H04N 5/2254; H04N 9/04557; H04N 5/238
See application file for complete search history.

(56) References Cited

U.S. PATENT DOCUMENTS 9,615,082 B2   4/2017   Sandrew et al.
9,979,932 B2   5/2018   Lee et al.
10,586,351 B1*   3/2020   Brailovskiy .............. G06T 7/90
2016/0330385 A1   11/2016   Sekiguchi et al.
2017/0006226 A1*   1/2017   Chino .................. H04N 5/2256
2018/0188634 A1   7/2018   Lundberg et al.
(Continued)

FOREIGN PATENT DOCUMENTS

EP   3422700 A1   1/2019
WO   WO-2021230933 A2 *   11/2021

OTHER PUBLICATIONS

Extended European Search Report dated Dec. 8, 2020 for European Patent Application No. 20182334.1.
(Continued)

*Primary Examiner* — John R Schnurr
(74) *Attorney, Agent, or Firm* — Volpe Koenig (57) ABSTRACT

A method for enhancing the performance of a video camera capable of switching between night-mode and day-mode operation comprises: acquiring a first sequence of images with the video camera with an IR-transmission filter of known transmission characteristics in front of an image sensor of the video camera, the IR transmission filter having a transmission in the IR-region of above 30%, and acquiring a second sequence of images with the video camera without the IR-transmission filter. The method then uses the first and second image sequences to measure the contribution from visual light, or a contribution of IR radiation to images in the first or second stream of images. The measurements utilize an assessment of the calculated contribution to improve the performance of the video camera by switching the video camera from night-mode to day-mode, or add color information to images acquired with IR-radiation to the image sensor.

9 Claims, 2 Drawing Sheets

(56) References Cited

U.S. PATENT DOCUMENTS

2019/0007665 A1* 1/2019 Hjelmström ......... H04N 5/2254
2019/0364187 A1* 11/2019 Kawasaki ............ H04N 5/2351
2020/0186711 A1* 6/2020 Chen ................... H04N 5/2254
2021/0195108 A1* 6/2021 Wang ................. H04N 5/23245
2021/0400167 A1* 12/2021 Heitz, III ............... H04N 1/465

OTHER PUBLICATIONS

Communication pursuant to Article 94(3) EPC dated Jun. 4, 2021 for European Patent Application No. 20182334.1.

* cited by examiner

METHOD FOR ENHANCING THE PERFORMANCE OF A VIDEO CAMERA

TECHNICAL FIELD

The present invention relates to a method, in a video camera, for assessing a measure of ambient light during night-mode image acquisition. It also relates to a method for timing a switch from night-mode operation to day-mode operation in a video camera.

TECHNICAL BACKGROUND

The use of IR (infra-red) filters for cameras is well known in the art, and in particular in relation to digital cameras. In short, the image sensor of the camera has a spectral response with a non-negligible component in the infrared, resulting in opportunities as well as in challenges. An opportunity lies in that in low-light conditions the IR-component may provide useful additional information about the imaged scene, information which may be enhanced even further by means of an IR-light source. A challenge is found during day-time imaging, where the addition of an IR-component will distort the color balance in the image, and it may also saturate the image sensor. Furthermore, since the camera will detect the radiation, parameters such as exposure settings may be affected in a way being detrimental to the displayed image.

A way of maintaining the beneficial effects while suppressing the less beneficial effects is to add a movable IR-cut filter in the beam path in front of the image sensor during day-mode operation. In this way, the IR filter may be used during daylight conditions, enabling acquisition of color images. Throughout the application "IR-cut filter" and "IR-filter" may be used interchangeably, and unless explicitly stated "IR-filter" will in the present context correspond to an IR-cut filter. During day-mode operation pixels of the image sensor will operate in a first manner, where the incident light detected as a charge on individual photodetectors, each photodetector being provided with filter so as to receive mainly red, mainly green, or mainly blue radiation, thus enabling color separation. During night-mode operation, e.g., in low-light conditions, the IR-cut filter may be removed. This means that there will be an increase in incoming light (or radiation) emanating from the IR-portion of the spectrum, an increase that can be used to improve the image quality but with the price of render color imaging difficult or impossible. Without an IR-cut filter the IR radiation will add intensity in every color channel, since every color channel has a response in the IR-region. This will skew the color information by the addition of an unknown factor in each color channel. Therefore, instead of performing a color separation during night-mode operation, the only parameter being maintained is the total intensity of the incoming radiation, for each pixel, which may be presented as a gray-scale intensity image (or in any desirable color scale). The addition of an IR light source may enhance the image even further.

In the straightforward solution, an IR-cut filter is arranged in front of the sensor, and an actuator is used for moving the filter between a position in which it completely covers the sensor ('day-mode') and a position in which it is completely removed from obscuring the image sensor ('night-mode'). When, starting from night-mode and a retracted filter, the IR-filter has been inserted, the image sensor can deduce if the amount of ambient light is sufficient or not. If it is not, the camera will switch back to night mode. When switching from night-mode to day-mode it is not uncommon that the light level with the IR-filter in the beam path is too low, and that a switch back to night-mode is necessary, resulting in a back-and-forth flickering between night-mode and day-mode. This results in noticeable flickering of the image, and a considerable wear on the actuator. Consequently, switching back and forth is not beneficial to user experience, and therefore there may be an assessment prior to the switch, in which the imaging unit tries to deduce the amount of visible light in the scene so as to be certain that a switch to day-mode is advisable.

For that purpose an auxiliary light sensor detecting a level of visual light while blocking IR-radiation may be used for controlling when to insert and when to remove the IR-filter, such that when the level of ambient light becomes too low, the camera switches to night mode by removing the IR filter and optionally using an IR light source, either carried by or incorporated in the camera, or arranged externally thereof, and when the ambient light level is sufficiently high a switch to day-mode may be performed. For many applications this solution provides an acceptable result, yet adding a further component adds to the cost and the complexity of the end-product. Also, most light sensors only measure an ambient overall light level, which results in that local variations in light level within an imaged scene may not be accounted for.

Improvements in IR-filter control by the provision of an improved method for acquiring a measure of ambient light level, in particular when operating in night-mode would be beneficial.

SUMMARY

According to another aspect, a method for enhancing the performance of a video camera switches between night-mode operation and day-mode operation. The method comprises acquiring a first sequence of images with the video camera without a second filter setup arranged in front of an image sensor of the video camera, acquiring a second sequence of images with the video camera with the second filter setup in front of the image sensor of the video camera. The second filter setup comprises an IR-transmission filter of known transmission characteristics and having a transmission in the IR-region of above 30%. The first and the second sequences of images are used to calculate a contribution from visual light, and/or a contribution of IR radiation to images in the first sequence of images or the second sequence of images of images. Furthermore, the calculated contribution, be it from IR or visual light, may be used for an assessment of the calculated contribution to improve the performance of the video camera by, switching the video camera from night-mode to day-mode or vice versa, or to deduce and add color information to images acquired with full or partial transmission of IR-radiation to the image sensor.

The method enables a straightforward manner of controlling or enhancing the performance of a video camera, since the calculated measure of a contribution from visual light and the contribution of IR-radiation may be used in several different ways. If the method is performed starting from night-mode operation, the assessment of visual light available may be used to deduce whether a switch to day-mode operation is advisable. If the switch is not advisable, the calculated values may still be used to add color information to images acquired in night-mode operation, which otherwise are presented in grayscale or other scale illustrating intensity rather than color. If the method is performed starting from day-mode operation, the color information may still be added to images acquired with the IR-transmission filter arranged in front of the image sensor. The method may also be performed and taken advantage of in situations where a filter with a first IR-transmission and a filter with a second IR-transmission are used, as long as there is a difference in IR-transmittance. The full pixel response (in terms of a value of intensity) will emanate from IR radiation and visual light, so if one is known, so will the other, regardless of which one is the target for the present assessment. If not clear enough already, this will be readily understood from reviewing the detailed description, and in particular the equation systems described there. From the calculation and assessment, it is possible to assess the total amount of visual (or IR) light available in the scene, i.e., to deduce the estimated response if a filter of any transmission is inserted in front of the sensor, notably, with the crude division of the spectral range into "visual" and "infrared", since this is the division relevant for the particular application. The first and second sequence may be consecutive sequences, yet they may also be interleaved depending on the application. The video camera may be a regular digital video camera, using a CCD or CMOS sensor, or any type of available sensor, and in particular a video camera utilized for monitoring or surveillance purposes.

Consequently, to specify further, in one or more embodiments the first sequence of images is acquired with a filter setup comprising an IR-cut filter arranged in front of the image sensor, i.e., with the camera operating in day-mode, while in other embodiments the first sequence of images is acquired without any IR-cut filter arranged in front of the image sensor, i.e., with the camera operating in night-mode. Adding to this, embodiments where intermediate modes—or mixed modes—where the first sequence of images is acquired with a filter setup including an IR transmission filter different than the one used in the second filter setup, may also be foreseen. The mixed modes are discussed further in the detailed description.

In one or several embodiments the assessment may be used to add color information to portions of the image otherwise having a skewed color information due to IR-contribution. The reason to why the color information may be skewed is discussed elsewhere in the present description, yet the inventive method provides a convenient method of deducing the data needed to correct for such skewed information.

In performing the present method there is a physical or mechanical filter switch occurring. This is not uncommon in video cameras, where a switch between day-mode and night-mode imaging by means of an IR-cut filter being inserted or removed from a position in front of the image is common practice. Still, the switch may generate a slight noise and a flicker in the image, which is one reason to why it is not performed continuously, or too often. In embodiment of the present invention the transmission of the IR-transmission filter may be selected so as not to generate a noticeable effect in the acquired images, or at least a less noticeable effect, but still the filter-switching may not be performed too often. For this reason, it may be preferred, in one or more embodiments, that the method further comprises segmentation of an image into areas with motion and areas without motion, wherein the addition of color information is applied in areas without motion. In this way there is less risk of adding a false color information to moving objects for which no color information were acquired during the last actuation of the method. The actual segmentation may be performed in one of many ways, and the actual technique or algorithm used is not central for the purposes of the present invention. Regular motion detection algorithms may be used to detect and locate moving objects or areas of motion, define an area including the moving object, and to refrain from adding color in the defined area. The area may follow the contour of the object with high accuracy, or include a slightly larger area, or even a rectangle including the entire object. In any case, the added color of the background may aid the operator to gain a better understanding of the current scene. In a typical night scene, a lack of color in a small area may not even be noticeable, and in any case the moving object will stand out from the background simply due to the fact that it is moving.

As has been indicated in the above, according to some embodiments, the first and second sequence of images is performed at regular intervals or as a result of an event, such that color information is updated at a lower rate than the fps of the video camera. These set of embodiments may be dependent on a particular application. In an outdoor installation a light level may be predictable from the time (and geographic location), while in an indoor installation the light level may be less predictable, or predictable in terms of working hours etc. The frequency at which a camera performs the method may vary with these parameters. As an example, there may be no need to perform the method frequently in the middle of a winter night, where darkness is to be expected, while closer to dawn the frequency may increase. If there is a detectable event in the scene, this could be an effect of a rapid change in light level, and therefore it may be worthwhile utilizing such an event as a trigger to perform the method.

In one or more embodiments, the camera may be maintained in operation with the IR-transmission filter arranged in front of the image sensor, i.e. in a mixed mode (not a pure night-mode nor a pure day-mode). Reasons for such an operation may be that the total amount of radiation reaching the image sensor is better in the mixed mode. In other embodiments the camera is switched to night-mode operation following the assessment for embodiments where the first image sequence was acquired with an IR-cut filter arranged in front of the image sensor.

One advantage of the invention as such is that by using the image sensor as a light (or radiation) sensor, there is no need for an additional light sensor to be included in the system. Moreover, there may be perfect overlap between a field of view provided by the video camera and the area in which light is assessed. Furthermore, in one or more embodiments, the assessment is performed at a resolution of groups of pixels, wherein the image is divided into multiple groups of pixels, which is a feature also enabled by the use of the image sensor as a light sensor.

In one or more embodiments, different regions of the image have different weights in the assessment. Such an embodiment may have an advantage if one or more regions stand out from the rest, in particular if that or those regions are of less interest. Then it may be advisable give those regions a lower weight such that, e.g., a switch between modes may be performed even if it is not beneficial for that or those particular regions. It may also work the other way around, that one or more regions are considered to be the only interesting ones, and to disregard other areas. In another application a greater weight may be given to pixels within an exposure window (e.g. the area prioritized by other algorithms of the camera, such as focus algorithms and exposure algorithms).

According to another aspect, a video camera arrangement for performing the method of claim 1 comprises at least one filter setup with an IR-transmission filter with known transmission characteristics and a transmission in the IR-region of above 30%, and at least one actuation mechanism for transferring the filter to and from a position in front of the image sensor. This particular video camera arrangement will provide an adequate platform for performing the method according to the embodiments where a night-mode is involved. In one or several further embodiments the video camera also comprises a filter setup with an IR-cut filter with an actuation mechanism for transferring the IR-cut filter to and from a position in front of the image sensor. In this way the embodiments of the method where a day-mode is involved may be performed as well.

In one or several embodiments more than one filter is arranged, e.g. both of the above-mentioned filter setups, on the same actuation mechanism. Since there is no need for more than one filter to be arranged in front of the image sensor, the use of the same actuation mechanism is both space efficient and cost efficient. Also, a reduction in the number of moving components and mechanism will lessen the risk of mechanical error. In some embodiments the IR-cut filter and the IR-transmission filter may be arranged side by side, so that the actuation mechanism may transfer them to and from the position in front of the image sensor by means of a translational or rotational motion.

In any embodiment the IR-transmission filter may have a transmission in the IR-region of above 30%, 40%, 50%, 60%, 70%, 80%, or 90%. This multitude of examples illustrate or is an effect of the different uses for the method. If a setup starts from night-mode, it is likely that the preferable transmission may be in the region above 70%, or even above 80% or 90%, while for a setup starting from day-mode an added benefit may be gained from having a filter with a transmission as low as 20% or 30%. Note the words "added benefit", since the use of the same filter as for the setup starting from night-mode will also have benefits. Consequently, it is not a situation of either the one setup or the other setup, both may be combined and used with the same filter setup and may provide advantages in relation to prior art in that form.

According to yet another aspect, a computer readable medium contains program instructions for causing a camera processor to perform the method of any one of the mentioned embodiments.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description. Hence, it is to be understood that is the teachings are not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

DETAILED DESCRIPTION OF EMBODIMENTS

Figure 1:
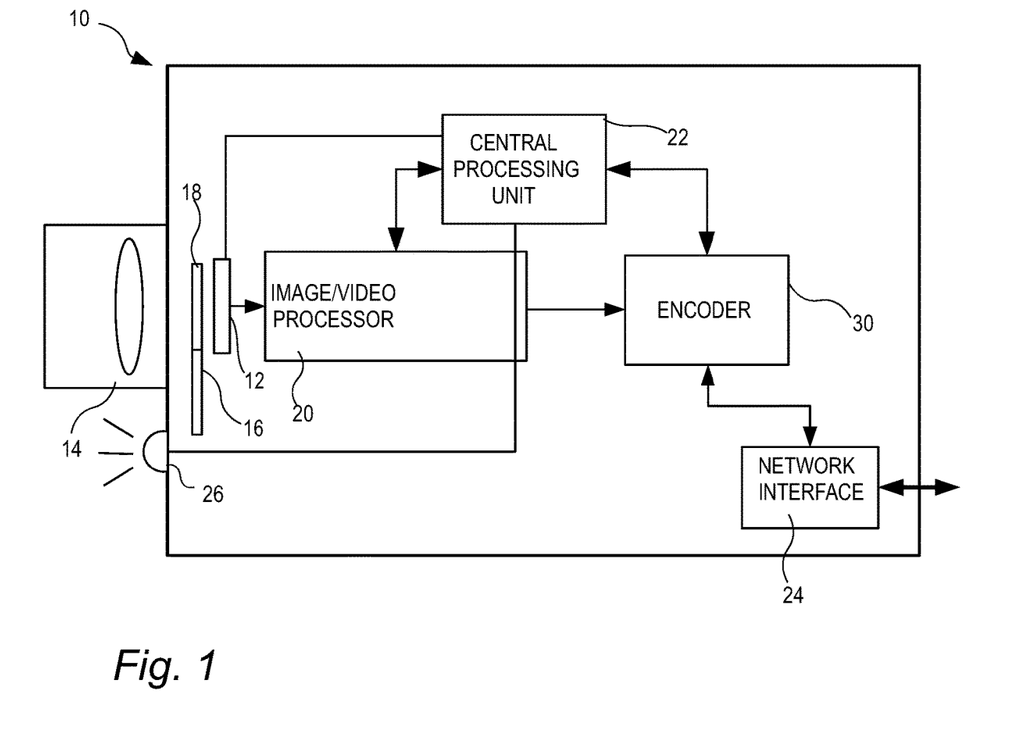
FIG. 1 is a schematic view of a camera setup, according to a generalized.

FIG. 1 illustrates a camera setup prepared for performing the present teachings according to various embodiments thereof. A surveillance camera 10 has an image sensor 12 and imaging optics 14. Spectral filters are arrangeable in front of the image sensor 12, and each filter may be switched between a position in which the image sensor 12 is covered by a filter and one in which it is not. In this way it is possible to control a spectral region of the light (or radiation in the case of any UV or IR being transmitted) reaching the image sensor 12. The spectral filters comprise an IR-cut filter 16 that removes any infrared radiation from reaching the image sensor 12 and one IR-transmission filter 18 that allows for a well-defined transmission of IR-radiation. The transmission in the IR-region for the IR-transmission filter may suggestively be about 80%, for reasons to be discussed, however, lower transmissions ratios may be used for some embodiments, even as low as 30% could be considered, as well as higher. In any embodiment, it is preferred that the filter has a spatially uniform transmission over its active area, so that each pixel of the image sensor 12 will be affected the same. In digital image processing, basically any compensation may be performed, so an uneven spatial transmission profile could be compensated for, but having a uniform one simplifies both the calculations and the understanding of the present invention. Each spectral filter is arranged in an actuator (not shown) so that it can be inserted and retracted from its position in front of the image sensor 12, which is what is done when switching between day-mode operation and night-mode operation as well as when performing the method of embodiments of the present invention. Each filter may be arranged in a separate actuator, if suitable for practical reasons (the same control mechanism may be used as is normally used for filter switching). For the purposes of the present teachings a single actuator may be used as well, since only one of the filters at a time is arranged in front of the image sensor 12. The filters may be attached to each other and the actuator may insert the relevant filter (or remove both) from a position in front of the image sensor by means of a translational or rotational motion.

Figure 2:
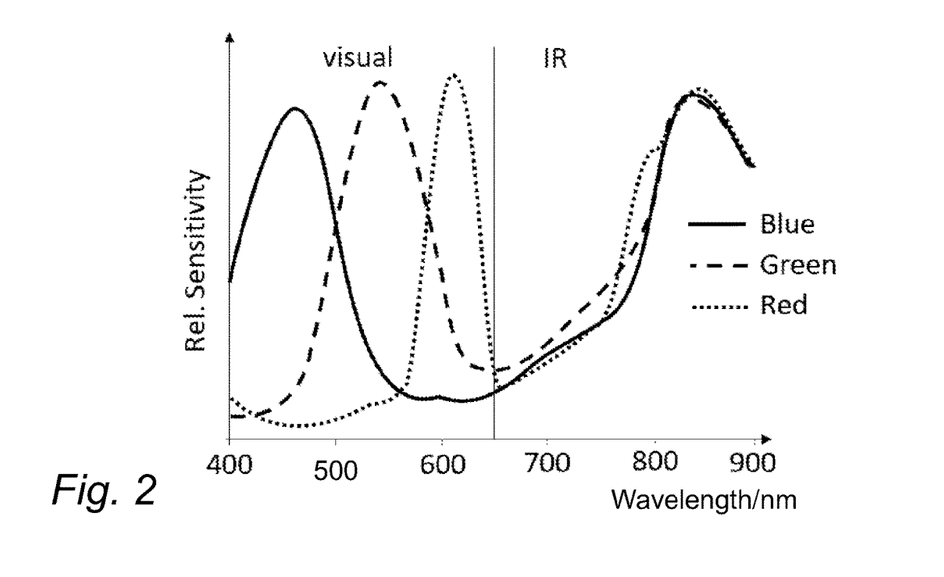
FIG. 2 is a schematic diagram illustrating the spectral response of a standard sensor chip.

Referring briefly to FIG. 2, when the IR-cut filter is arranged in front of the sensor 12 during day-mode operation, the entire IR-portion of the spectrum is removed, meaning that a signal measured by the red, green and blue channel, respectively, may be resolved and converted to a color image. The incident light is separated into different color channels by use of a color filter array arranged in front of, or even combined with, the image sensor. A Bayer filter is a color filter array commonly used for this purpose.

Notably, as also indicated in FIG. 2, each color channel has a spectral response in the NIR spectral region, meaning that each color filter in the color filter array (the Bayer filter) will have a transmission in the IR-region) and as the IR-cut filter is removed from the image sensor, in night-mode operation, this part of the spectrum will be incident on the image sensor as well. This will significantly increase the amount of collected radiation at the cost of losing the possibility to reproduce a true color representation of the scene, which is why it is common practice to use a grayscale representation in night-mode imaging. In this night-mode operation an image quality may be further increased by arranging an IR-illumination source, providing an "invisible" illumination having the desired effect while still not being visible or disturbing to the human eye.

As the IR-cut filter 16 is removed the IR-transmission filter 18 may take its place, in a mixed-mode operation also referred to as an "enhanced mode". The IR-transmission filter will have a well-defined transmission in the IR-region and full transmission in the visual region.

The above three modes, the day-mode, the night-mode and the mixed mode, open up for further refinements in a video camera operation, one branch of which starting from night-mode operation and one from day-mode operation.

Figure 3:
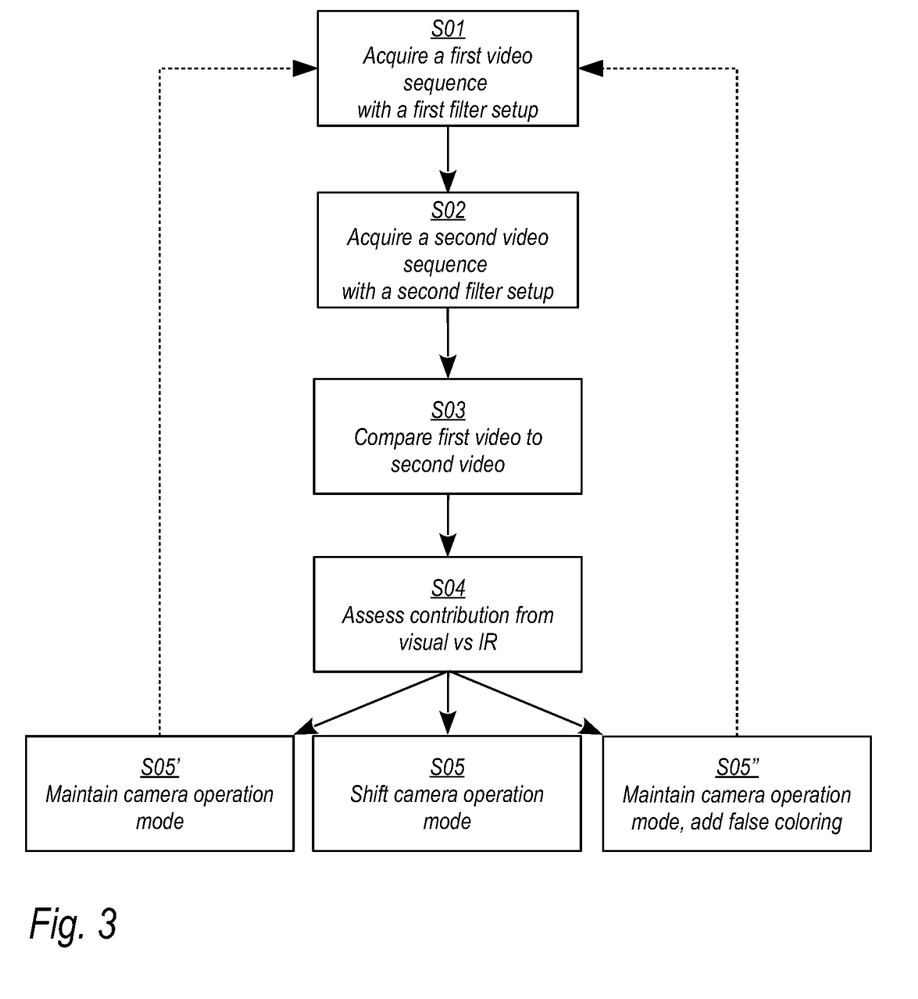
FIG. 3 is a flow diagram according to one or more embodiments.

Referring to FIG. 3 the first branch is described, i.e., the one starting from night-mode operation. A challenge when operating in night-mode is to find a suitable time for switching to day-mode operation. The issues relating to this has been described in the background section of the present description. In this first embodiment of a method, a first sequence of images is acquired S01 with no filter arranged in front of the image sensor (since the camera is operating in night-mode this acquisition is done continuously). In the second step S02 the IR-transmission filter 18 is arranged in front of the image sensor 12, resulting in a corresponding reduction in IR-radiation transmitted to the image sensor 12, and a second sequence of images is acquired. For this embodiment it is preferred that the IR-transmission is kept high enough for enabling a reasonably good night-mode operation, hence the suggested IR-transmission of about 80%. A 90% transmission would obviously give a better night-mode operation, yet the quality of the subsequent assessment may be affected negatively. The subsequent assessment would, on the other hand, benefit from a 50% transmission, yet that could affect the night-mode operation adversely, as the total amount of radiation reaching the image sensor 12 would be drastically reduced. These or other transmission levels should not be ruled out from being utilized in described embodiments, rather the most suitable transmission may vary with the particular application. For this reason, a number of different IR-transmission filters may be included in the filter setup. Following the acquisition of the second sequence of images the IR-transmission filter 18 may be removed from its position, or kept in place. Removed, if it is deemed that the ambient light level is too low for operation in mixed mode, or merely since it may be preferred to maintain the enhanced image quality provided in the night mode. If the assessment of the ambient light level concludes that it is at a level such that a switch to day mode is deemed appropriate, this will be effected. The IR-transmission filter could be kept in place if, e.g., the visual light level is too low a switch to day-mode, but high enough to allow for adequate imaging. In an embodiment where a number of different IR-transmission filters are available, a switch to transmission filters with gradually lower transmittance could be effected. Notably, regardless if the IR-transmission filter is retracted or not, the color information provided (see below) may enable coloring ("enhancement") of the grayscale night-mode image.

Turning now to the next step S03, and the calculation and assessment mentioned. Following the insertion of the IR-transmission filter, and the acquisition of the second sequence of images data is available for performing the assessment. The first sequence of images contains information of the full visual spectrum and the full IR spectrum (limited, obviously, by the spectral response of the image sensors, as well the transmission properties of imaging optics and filters not mentioned in relation to embodiments), while the second sequence of images contains information of full visual and a known fraction of IR. It is thereby possible to set up an equation system containing two unknowns—the IR contribution and the visual contribution—and two equations—the first image sequence and the second image sequence. Performing an assessment S04 of a measure of a ratio between a contribution from visual light and contribution of IR radiation is thereby enabled. The equations are:

$$I_1 = VIS + IR$$

$$I_2 = VIS + f \cdot IR$$

where $I_1$ is the first sequence of images that contains information of the full visual spectrum (VIS) and the full IR spectrum (IR), and $I_2$ is the second sequence of images that contains information of full visual and a known fraction of IR (f). This equation system may be readily solved, resulting in that measures concerning the amount of IR-contribution and the amount of visual contribution may be deduced:

$$IR = (I_1 - I_2)/(1-f)$$

$$VIS = (I_2 - I_1 \cdot f)/(1-f)$$

In a simplified explanation the assessment of IR/visual contribution is very straightforward. Two values are collected for each pixel or each group of pixels: a reading of the intensity with full visual contribution and 100% IR contribution (when starting from night-mode, it would be 0% when starting from day-mode). Let us say that this value is 200. Next a reading of the same area with full visual contribution and 80% IR contribution (as the IR-transmission filter is introduced). Let us say that this reading is 180. From these two readings we can conclude by using the equations above that the total visible contribution is 100 and the total IR contribution is 100. Knowing the visible contribution also enables for us to extract color information for each color channel, and in the same way as a color image is generated from intensity data in normal day-mode operation. The assessment would operate in the same way if both image sequences are acquired with an IR-transmission filter arranged in front of the image sensor, provided that there is a difference in transmittance.

The above describes a simplified situation. In use, one may prefer to alter exposure settings (exposure time, gain), acquire values from several exposures to generate good statistics for a mean value, etc. Such measures are of course both possible and advisable, and the assessment would have to compensate for this. Moreover, the IR-transmission filter 18 may also remove some visible light due to limitations of the filter. Hence, a more extended set of equations are:

$$I_1 = VIS + IR$$

$$I_2 \cdot exposure_1/exposure_2 = g \cdot VIS + f \cdot IR$$

where $exposure_1 = $ exposure time·gain is the exposure for the sequence of images $I_2$, $exposure_2$ is the exposure for the sequence of images $I_2$, and g is the known fraction of visible light that that is transmitted by the IR-transmission filter 18.

In the next step this information may be used to decide if a switch to day-mode imaging is advisable or not. Such a decision may be based on predetermined thresholds, e.g., in terms of an ambient light level, which in terms may be governed by a performance of the camera presently being used. Apart from this objective decision ground, the thresholds may be adjusted depending on user preferences. As an example, the objective decision may be to maintain a night-mode (S05'), yet a user may still prefer to have some color information, although not perfect, and therefore opt for an earlier shift. If that is the case, the IR-cut filter 16 may take the place of the IR-transmission filter 18 (if the IR-transmission filter has not already been removed following the acquisition of the second image sequence, in which case the IR-cut filter 16 is simply inserted in front of the image sensor instead of having no filter arranged there).

If the information and present threshold settings results in the decision that the night-mode should be maintained (S05), the IR-transmission filter 18, if still arranged in front of the image sensor, may preferably be removed in order for more IR-radiation to be transmitted.

In a situation where it is decided not to switch to day-mode, i.e. where night-mode or mixed mode is maintained, the information concerning the amount of visual light may be used to add color information to the gray-scale image from the night-mode operation (S05"). This is possible to accomplish since the evaluation may be made on the level of individual pixels or groups of pixels. In this mode the above sequence of method steps may be repeated at regular intervals, which may be used to renew the decision regarding to switching to day-mode or not, or to update the color information added to the night-mode images. When operating in this mixed mode, the ambient light level (in the visual spectrum) may be very low (too low for day-mode operation), the operation may be adjusted such that an exposure time or a number of exposures is increased as the IR-transmission filter is arranged in front of the image sensor, so as to increase the amount of visual light collected by the image sensor to improve the quality of the assessment.

There are several techniques for fusing the color information into the gray-scale image, and the techniques may be simplified since that there is perfect overlap between the two (or more) images. In a simplistic approach the intensity component (e.g., the luma, the brightness) is taken from the image containing IR while the color component (e.g., the chrominance) is fetched from either the image not containing any IR or from the calculated color component deduced from comparing images with differing IR-contribution, as described before.

FIG. 3 also illustrates the second branch, where the initial state is day-mode operation. When starting from day-operation the decision of whether to switch to night-mode or not is less complicated than the other way around. Simply, when an ambient light level is too low for day-mode operation, a switch to night-mode operation is performed, and the result is predictable with an increase in radiation emanating from the IR-spectrum reaching the image sensor. This could be compared with when switching from night-mode, where the present image is good, and the unknown is how good it will be following the switch. When switching from day-mode this is usually initiated by the fact that the present image has deteriorated (as determined by a noise level, intensities, or some other evaluation of current video statistics) and with the knowledge that the collected intensity will increase as the IR-cut filter is removed.

For the actual operations performed, the steps are similar, yet a first sequence of images is acquired (S01) with the IR-cut filter 16 arranged in front of the image sensor 12, whereas the second sequence is acquired (S02) with the IR-transmission filter 18 arranged in front of the image sensor—as described in relation to the first branch. In this case the setup is used mainly to provide color images at lower light levels. Completely analogous to the equation system discussed above it will be possible to deduce the contribution from visual light and IR radiation (S04), respectively, and this may be used to add color information to image sequences acquired with the IR-transmission filter arranged in front of the image sensor (S05"). Notably, when coming from day-mode operation and adding an IR-cut filter there is true color information available already, and this color information may be added to images acquired with the IR-transmission of the IR-cut filter arranged in front of the image sensor. As for the previous branch the assessment and calculation of IR vs. visual may have to be updated now and again to account for changes in the imaged scene, such as objects appearing or disappearing, or changes in the ambient light level. It is preferable that the method be performed as "invisible" as possible. This means that even if color information is readily acquired by switching the camera to day-mode, this may not be a desirable action since it would have a significant impact on the amount of radiation reaching the image sensor, and by that it would be visible (i.e. disturbing) to an operator and likely to affect evaluation algorithms in a detrimental manner (as mentioned before). For this branch of embodiments in particular, the addition of further IR-transmission filters with different IR-transmission ratios may be desirable, such that gradual changes may be introduced before switching to full night-mode.

For any of the two branches it may be beneficial to reduce the output of any IR-illuminator prior to performing the method, e.g. to zero output, in order to obtain a more reliable value. The output may also be left as it is or reduced to a fraction of 1 instead of to zero. When the color information added is historical it may not account for new objects entering the scene, at least not in an optimal manner. Therefore, it may be preferably to withhold coloring of moving objects, which is readily done using input from one of any object detection algorithms available. In an example, a straightforward motion detection algorithm is used to detect a moving object. As the artificial coloring is performed, it may be applied to background areas only, i.e. areas without any motion. Depending on the precision of the motion detection algorithm the size of the area around the object may range from an almost perfect outline, or a rectangle larger than the actual object. The result will thus not be perfect from a coloring perspective, yet the color information may facilitate the understanding of the scene. Furthermore, when collecting data for the color information the video camera may change its imaging parameters to a longer exposure time, higher gain, or merely collect information from a full sequence of images to improve a signal to noise ratio (at the cost of a decrease in temporal resolution). In embodiments where moving objects are treated differently, there may be a timer deciding when a moving object is considered to be a stationary object and included in the background. An example could be a situation where a parking lot is monitored. A car entering the parking lot is obviously a moving object, but once it is being parked it is likely to be stationary long enough to be included in the background. In such a situation a timer e.g. keeping track of either how long a pixel value has remained unchanged (within a threshold) or how long a detected object has been stationary, may be used to support a decision regarding when an area should be transformed from background to foreground. The other way around would be when a car at the parking lot starts moving after having been stationary long enough to be categorized as background. In such a situation the motion may be detected momentarily, and coloring may be removed of the moving area. A problem that will have to be addressed in such a situation is what to do with the area previously covered by the car, and there are several options for that issue. One option is to use previously saved color data, if such data exists. Another option is not to add color in that area, and simply wait for the next update of color information.

Returning to FIG. 1, the video camera has a housing 10. In FIG. 1 the housing is rectangular, yet it should be noted that the camera housing 10 may take many different forms, and for the purposes of the present invention any known form may be used (not excluding unknown forms, unless they make it impossible to realize the invention). Furthermore, the functions performed by the camera may be effected in different units, such that an image is collected in one physical location and transferred for processing via a wire (or wireless) to another unit. Such approaches are not uncommon in applications where it is a benefit that the image collection portion of the camera is kept as small as possible. An image processor or video processor 20 (or a combination thereof) is arranged to process image data collected by the image sensor 12, and to feed it forward to an encoder 30. A central processing unit 22 is arranged to control the processes, and in FIG. 1 the central processing unit 22 represents all control units of the camera, although in a practical installation the processing control may be distributed in different units. In most cases the camera (or one of the units, referring to the above text) will also comprise a network interface 24 for communication beyond the constraints of the camera. The above description is understandably a very simplified account for a modern video camera, and for a more detailed knowledge the interested reader may turn to the product portfolio of the present applicant. The overall flow obviously has the direction from the image sensor 12 towards the encoder 30 and the network interface 24, yet there are feed-back mechanisms going the other way as well.

Furthermore, the video camera of FIG. 1 may comprise an IR-illumination source 26. In the illustrated embodiment the IR-illumination source 14 is arranged on a housing of the video camera 10, yet it may in other embodiments be provided as a separate device connected to the camera and controlled by the camera or an external controller also controlling aspects of the camera. The schematic representation also covers an embodiment where the IR-illumination source 14 is an array of several IR-illuminators. If needed an additional control unit may be added for controlling the IR-illumination source 14, although this control may be included, or said to be included, in the central processing unit 22 as well. Furthermore, an additional driver unit (not shown) may be arranged for supplying power to the IR-illumination source 14, or rather supply and control the power supplied to the LED in a suitable way for the purposes of a particular mode of operation. The driver unit, if installed, could also provide the control otherwise provided by the CPU or the MCU 22.

The sequence of image frames acquired with the IR-transmission filter arranged in front of the image sensor will represent an anomaly compared to the surrounding image frames (the image frames before and after the sequence). Depending on the situation such anomaly may have some detrimental effects. The most apparent one would be that a sudden reduction in intensity may result in a flicker, which, if not compensated for, may disturb an operator observing the scene via a display. Also, the rapid change in intensity could trigger a motion sensor, or foreground/background detection algorithm, which is could result in that a tracked object is lost, or that the entire scene is classified as foreground. Minimizing the length of the sequence to a single or a low number of frames may be a sufficient measure for addressing this effect, as the operator may not notice a difference in a single frame and the analytics may have an intended slowness not to react inadvertently. Another issue may be that a sudden change in intensity may trigger a motion detector, thus generating a false detection of movement in the scene. This may be solved by having the central processing unit 22, or the image/video processor 20, tag the frames acquired with the IR-transmission filter 18, such as to withhold them from a video stream from the camera, or merely to mark them such that they are not shown or used in any evaluation, which is an option being readily available in present encoding standards, such as h.264 and h.265, etc. Consequently, the central processing unit 22 may withhold evaluation of the sequence of frames with algorithms not directly associated with the assessment of ambient light, meaning that a possible fluctuation in pixel intensity does not result in a false detection of movement in the scene monitored by the camera, or in an erroneous adjustment of white balance, etc. In relation to the first effect, that the video may flicker, this may be addressed by other measures as well. If the sequence of frames is to be shown to an operator, and if the effect is considered to be visible, a gain could be applied to the image frames of the sequence, so as to make their overall intensity mimic that of the surrounding image frames. Such correction may be carried out automatically by the image processor handling the digital image stream. Alternatively, or in addition, the exposure (i.e. exposure time and gain) could be altered for the frames in the sequence, so that the total intensity may be closer to the one of the surrounding frames. A change in exposure may be readily accounted for in the assessment of visual light vs IR-radiation.

One aspect according to several embodiments is that the entire image sensor may be used as an ambient light sensor, enabling a user to have a spatially resolved ambient light assessment. In the assessment of the ambient light level the intensity could be measured as a single value, or as a processed sum of some or all pixel intensities, e.g. by taking the average of some or all pixel values and normalize by the exposure time and gain. In other embodiments, the full resolution and full field of view presently used by the image sensor could be used. In still other embodiments various downscaled resolutions could be used, so as to reduce processing requirement while still enabling a degree of spatial resolution over the imaged scene. Since the entire image sensor may be used in the assessment of ambient light level, the spatial resolution could, in one or several embodiments, be used to an advantage. The spatial resolution makes it possible to select an area in the image of the scene for the assessment, e.g. if a certain area is of particular importance, and the ambient light level in this area is selected as a critical factor. The area may be a preset area, such as an area in the middle of the camera view, or a number of smaller areas distributed in the imaged scene (i.e. over the image sensor), e.g. similar to regular exposure zones. The opposite, that a certain area may be disregarded, is also enabled. An example of that would be that a particular area contains an IR-source, or is particularly dark, and therefore is not representative for the scene as such. Specific areas may also be excluded if they, e.g., contains saturated pixels. In any case, there will by default be a perfect overlap between image sensor data and ambient light sensor data, since the image sensor is the component collecting the data. The effect may be particularly useful when digital zoom is used, since an overall ambient light level may be less and less relevant as a digital zoom is increased (since a gradually smaller portion of the full image sensor is used). An example of this could be a situation when a scene is observed using a fish-eye lens having a very large field of view. In such a situation digital zoom may be used to look at a comparatively small fraction of the scene, and an ambient light level as detected by the entire sensor may not be representative in the smaller field of view selected using the digital zoom. In such an example, parameters of the digital zoom (and pan and tilt) may be accounted for in the method, such that, e.g., only the current view is used for the assessment.

Following the evaluation of the measure representing the ambient visual light level, in a portion of the scene or in the full scene, a decision may be taken, and if found suitable the IR-cut filter may be inserted and the camera may start operating in day-mode. The evaluation itself does not consume a lot of computational or electrical power, yet there is no need for it to be performed continuously, which opens up for a set of various embodiments. These embodiments may be combined in various manners. According to one embodiment the evaluation is performed at regular intervals, such as every couple of minutes (1, 2, 3 . . . , 10, 20, etc.) For an outdoor installation where the sunlight is the only source of ambient light, the evaluation may be synchronized with the rise of the sun, such that the evaluation is not performed at all when there is no sunlight, and starts at a time when there is a chance of sufficient ambient sunlight for day-mode operation. The time may vary with time of year in a very predictable way, and it may also vary with the current weather situation in a less predictable way. In such an embodiment the data regarding a suitable time may be fed to the camera in a user interface (by the setting of an actual time, or by setting a current time and an approximate geographical position of the camera, etc.). It may also be a statistically based decision meaning that the camera could learn when a suitable time would be based on the decision from previous days. For an indoor installation sunlight may be irrelevant for the control, and in such a situation working hours or a history of when the location is used (i.e. when indoor lighting is usually activated) could be used in a corresponding way. In still other embodiment the timing of the evaluation could be triggered by an event in the scene. If someone enters an indoor location where the camera is arranged and flicks on the light, there will be a detectable change in intensity in the image of the scene. Such a change may be used as a trigger for the evaluation. Similar approaches may be used of outdoor installations as well, in particular in locations where artificial lighting is installed.

The invention claimed is:

1. A method for enhancing the performance of a video camera capable of switching between night-mode operation and day-mode operation, comprising:
   acquiring a first sequence of images with the video camera without a second filter setup arranged in front of an image sensor of the video camera and without any IR-cut filter arranged in front of the image sensor, i.e., with the video camera operating in night-mode,
   acquiring a second sequence of images with the video camera with the second filter setup in front of the image sensor of the video camera, the second filter setup comprising an IR-transmission filter of known transmission characteristics and having a transmission in the IR-region of at least 30% and below 100% and spatially uniform transmission over its active area such that every pixel of the image sensor will be affected uniformly, wherein the second filter setup has a transmission of visual light of 100% and wherein the first and second sequences of images are consecutive or interleaved,
   using the first and the second sequences of images to calculate a contribution of visual light in images in the first sequence of images and the second sequence of images, and
   utilizing an assessment of the calculated contribution to improve the performance of the video camera by, switching the video camera from night-mode to day-mode based on the contribution of visual light in the images in the first sequence of images and the second sequence of images, or to deduce and add color information to images acquired with full or partial transmission of IR-radiation to the image sensor based on the contribution of visual light in the images in the first sequence of images and the second sequence of images.

2. The method of claim 1, wherein the assessment is used to add color information to portions of the image otherwise having a skewed color information due to IR-contribution.

3. The method of claim 2, further comprising segmentation of an image into areas with motion and areas without motion, wherein the addition of color information is applied in areas without motion.

4. The method of claim 1, wherein the acquisition of the first and second sequence of images is performed at regular intervals or as a result of an event, such that color information is updated at a lower rate than a current frame rate of the video camera.

5. The method of claim 1, wherein the assessment is performed at a resolution of groups of pixels, wherein the image is divided into multiple groups of pixels.

6. The method of claim 1, wherein different regions of the image have different weights in the assessment of the calculated contribution.

7. The method of claim 1, wherein the IR-transmission filter has a transmission in the IR-region of above 40%, 50%, 60%, 70%, 80%, or 90%.

8. A video camera capable of switching between night-mode operation and day-mode operation, comprising:
   an image sensor acquiring a first sequence of images without a filter setup arranged in front of an image sensor and without any IR-cut filter arranged in front of the image sensor, i.e., with the video camera operating in night-mode,
   the image sensor acquiring a second sequence of images with the filter arranged in front of the image sensor, the filter setup comprising an IR-transmission filter of known transmission characteristics and having a transmission in the IR-region of at least 30% and below 100% and spatially uniform transmission over its active area such that every pixel of the image sensor will be affected uniformly, wherein the second filter setup has a transmission of visual light of 100% and wherein the first and second sequences of images are consecutive or interleaved,
   an actuation mechanism for transferring the filter setup to and from a position in front of the image sensor,
   a processor for receiving the first and the second sequences of images to calculate a contribution of visual light in images in the first sequence of images and the second sequence of images, and utilizing an assessment of the calculated contribution to improve the performance of the video camera by, switching the video camera from night-mode to day-mode based on the contribution of visual light in the images in the first sequence of images and the second sequence of images, or to deduce and add color information to images acquired with full or partial transmission of IR-radiation to the image sensor based on the contribution of visual light in the images in the first sequence of images and the second sequence of images.

9. The video camera of claim 8 wherein the IR-transmission filter has a transmission in the IR-region of above 40%, 50%, 60%, 70%, 80%, or 90%.

\* \* \* \* \*